United States Patent
Gerstenmeyer

(10) Patent No.: US 12,116,964 B2
(45) Date of Patent: Oct. 15, 2024

(54) DEWATERING FUEL IN A DIESEL LOCOMOTIVE

(71) Applicant: SIEMENS MOBILITY GMBH, Munich (DE)

(72) Inventor: Stephan Gerstenmeyer, Bubenreuth (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 17/540,634

(22) Filed: Dec. 2, 2021

(65) Prior Publication Data

US 2022/0090569 A1   Mar. 24, 2022

Related U.S. Application Data

(63) Continuation of application No. 16/462,307, filed as application No. PCT/EP2017/078327 on Nov. 6, 2017, now abandoned.

(30) Foreign Application Priority Data

Nov. 18, 2016 (DE) ...................... 10 2016 222 778.5

(51) Int. Cl.
  *F02M 37/00* (2006.01)
  *B01D 17/02* (2006.01)
  (Continued)

(52) U.S. Cl.
  CPC ....... *F02M 37/007* (2013.01); *B01D 17/0214* (2013.01); *F02M 37/28* (2019.01);
  (Continued)

(58) Field of Classification Search
  None
  See application file for complete search history.

(56) References Cited

U.S. PATENT DOCUMENTS 3,012,675 A * 12/1961 Phelps ............... B01D 17/0214
                                                      210/123
3,249,229 A *  5/1966 Kasten ................... B60K 15/00
                                                      210/197
(Continued)

FOREIGN PATENT DOCUMENTS

DE            2735822 A1     2/1979
DE        10122674 A1    11/2001
(Continued)

*Primary Examiner* — Robert J Popovics
(74) *Attorney, Agent, or Firm* — Laurence A. Greenberg; Werner H. Stemer; Ralph E. Locher

(57) ABSTRACT

A method for dewatering an operating substance, more particularly a fuel, preferably during the operation of a vehicle, more particularly a rail vehicle, includes conveying an operating substance from an operating substance tank. Water present on or in the fuel is first collected in a water container, and water is conveyed, in chronological order, from the water container back to the operating substance tank, then to an exhaust system and/or from the operating substance tank to the exhaust gas system. A dewatering device for an operating substance, more particularly a fuel for a vehicle, more particularly a rail vehicle, includes a water container, in which water present on or in the fuel is collected. The dewatering device has a dewatering conduit or line which runs from the water container to an operating-substance tank of the vehicle and/or to an exhaust-gas system of the vehicle.

11 Claims, 2 Drawing Sheets

(51) Int. Cl.
*B60K 15/077* (2006.01)
*F02M 37/28* (2019.01)
*F02M 37/32* (2019.01)

(52) U.S. Cl.
CPC ......... *F02M 37/32* (2019.01); *B01D 2221/08* (2013.01); *B01D 2257/80* (2013.01); *B60K 2015/0772* (2013.01); *F02M 37/0082* (2013.01)

(56) References Cited

U.S. PATENT DOCUMENTS

| | | | | |
|---|---|---|---|---|
| 3,279,380 A * | 10/1966 | Clark | G01F 23/36 | 417/40 |
| 3,297,161 A * | 1/1967 | Kasten | F02M 37/54 | 210/114 |
| 3,568,835 A * | 3/1971 | Hansen | B01D 21/26 | 210/123 |
| 3,998,049 A * | 12/1976 | McKinley | F01K 21/04 | 123/46 R |
| 4,024,848 A * | 5/1977 | Lee | B60K 15/03504 | 123/198 A |
| 4,157,082 A * | 6/1979 | Day | F02M 37/0047 | 123/DIG. 2 |
| 4,257,890 A * | 3/1981 | Hurner | B01D 17/0214 | 210/309 |
| 4,296,723 A * | 10/1981 | Aldrich | F02M 37/0047 | 210/DIG. 5 |
| 4,334,989 A * | 6/1982 | Hall | F02M 37/30 | 210/114 |
| 4,388,893 A * | 6/1983 | Apfel | F02D 19/12 | 123/25 J |
| 4,491,143 A * | 1/1985 | Yasuhara | F02M 37/0047 | 210/167.01 |
| 4,542,621 A * | 9/1985 | Andersson | F23J 15/006 | 95/228 |
| 4,565,629 A * | 1/1986 | Wilson | F02M 37/28 | 210/DIG. 5 |
| 4,637,351 A * | 1/1987 | Pakula | F02M 35/042 | 210/114 |
| 4,795,556 A * | 1/1989 | Brotea | F02M 37/24 | 210/DIG. 6 |
| 4,799,504 A * | 1/1989 | Scragg | F02M 37/28 | 137/172 |
| 4,809,934 A * | 3/1989 | Rix | B64D 37/34 | 244/135 R |
| 4,846,967 A * | 7/1989 | McGehee | C10M 175/0033 | 210/182 |
| 4,860,713 A * | 8/1989 | Hodgkins | F02M 37/32 | 123/514 |
| 4,898,140 A * | 2/1990 | Pages | F02D 33/006 | 123/514 |
| 4,933,077 A * | 6/1990 | Wolf | F02M 37/0047 | 123/557 |
| 4,933,093 A * | 6/1990 | Keller | F02M 31/16 | 210/450 |
| 4,979,482 A * | 12/1990 | Bartlett | F02M 37/0082 | 123/514 |
| 5,053,120 A * | 10/1991 | Mollmann | B01D 36/005 | 123/25 J |
| 5,078,901 A * | 1/1992 | Sparrow | F02M 37/28 | 210/114 |
| 5,110,460 A * | 5/1992 | Gilas | B01D 36/003 | 210/DIG. 17 |
| 5,322,624 A * | 6/1994 | Rogers | F02M 37/32 | 210/232 |
| 5,336,396 A * | 8/1994 | Shetley | F02D 19/0668 | 210/90 |
| 5,534,161 A * | 7/1996 | Tarr | F02M 37/16 | 210/114 |
| 5,578,221 A * | 11/1996 | Janik | B01D 36/003 | 123/198 C |
| 5,788,859 A * | 8/1998 | Biere | B01D 17/10 | 210/450 |
| 5,794,598 A * | 8/1998 | Janik | F02M 31/20 | 123/541 |
| 5,887,573 A * | 3/1999 | Janik | F02M 37/48 | 123/514 |
| 6,170,470 B1 * | 1/2001 | Clarkson | F02M 37/10 | 123/25 C |
| 6,207,045 B1 * | 3/2001 | Jiang | B01D 17/0214 | 210/114 |
| 6,270,659 B1 * | 8/2001 | Bagci | B01D 35/26 | 210/111 |
| 6,289,853 B1 * | 9/2001 | Walczak | F02B 61/045 | 123/25 C |
| 6,371,087 B1 * | 4/2002 | Condran | F02M 37/0052 | 123/514 |
| 6,422,396 B1 * | 7/2002 | Li | B01D 17/045 | 210/DIG. 5 |
| 6,432,298 B1 * | 8/2002 | Carvalko, Jr. | B01D 17/045 | 210/512.1 |
| 6,435,142 B2 * | 8/2002 | Harvey | F02M 37/28 | 123/25 R |
| 6,444,121 B1 * | 9/2002 | Maxwell | B01D 17/10 | 123/514 |
| 6,510,844 B2 | 1/2003 | Kojima et al. | | |
| 6,596,174 B1 * | 7/2003 | Marcus | B67D 7/766 | 210/764 |
| 6,676,841 B2 * | 1/2004 | Akins | F02M 37/32 | 701/33.9 |
| 6,698,387 B1 * | 3/2004 | McFarland | F02M 25/0225 | 123/255 |
| 6,709,576 B2 * | 3/2004 | Jokschas | B01D 36/006 | 210/114 |
| 6,729,310 B2 * | 5/2004 | Ekstam | B01D 36/003 | 123/541 |
| 6,881,328 B2 * | 4/2005 | Dittmann | F02M 37/28 | 210/799 |
| 6,923,165 B1 * | 8/2005 | Draves | F02M 37/24 | 123/457 |
| 6,953,527 B2 * | 10/2005 | Brower | B01D 36/003 | 210/313 |
| 6,974,537 B2 * | 12/2005 | Abdelqader | B01D 36/005 | 210/114 |
| 7,048,851 B2 * | 5/2006 | Decaux | F02M 37/30 | 210/186 |
| 7,101,239 B1 * | 9/2006 | Torgerud | F02M 37/007 | 440/88 F |
| 7,163,003 B2 * | 1/2007 | Bradford | B01D 35/1576 | 123/514 |
| 7,192,518 B2 * | 3/2007 | Roesgen | F02M 37/30 | 210/171 |
| 7,223,348 B1 * | 5/2007 | Seregin | B01D 17/04 | 210/802 |
| 7,331,472 B2 * | 2/2008 | Seregin | B01D 17/0208 | 210/521 |
| 7,415,819 B2 * | 8/2008 | Ruona | F01N 3/005 | 60/303 |
| 7,429,322 B2 * | 9/2008 | Fujita | F02M 37/34 | 210/172.6 |
| 7,449,109 B2 * | 11/2008 | Pichler | B01D 35/301 | 210/259 |
| 7,453,271 B2 * | 11/2008 | Straub | G01N 33/18 | 123/25 J |
| 7,655,140 B2 * | 2/2010 | Wieczorek | F02M 37/44 | 210/120 |
| 7,850,846 B2 * | 12/2010 | De La Azuela | F02M 37/28 | 210/114 |
| 7,976,700 B2 * | 7/2011 | Arakawa | B01D 63/087 | 210/114 |
| 8,038,872 B2 * | 10/2011 | Jokschas | B01D 35/18 | 210/86 |
| 8,114,278 B2 * | 2/2012 | Lorente | B01D 36/001 | 210/DIG. 17 |
| 8,231,779 B2 * | 7/2012 | Jokschas | B01D 27/08 | 219/205 |

(56) References Cited

U.S. PATENT DOCUMENTS

| | | | | |
|---|---|---|---|---|
| 8,590,493 B1* | 11/2013 | Torgerud | | F02M 37/24 123/25 J |
| 8,613,853 B2* | 12/2013 | Eberle | | B01D 35/147 210/114 |
| 8,651,068 B1* | 2/2014 | Torgerud | | B01D 17/0214 123/25 J |
| 8,655,542 B2* | 2/2014 | Narisako | | B01D 36/005 701/29.6 |
| 8,673,138 B2* | 3/2014 | Braunheim | | F02M 37/34 210/114 |
| 8,726,853 B2* | 5/2014 | Ortlepp | | F01N 3/04 123/25 J |
| 8,733,087 B2* | 5/2014 | Core | | B01D 36/005 60/309 |
| 8,958,972 B1* | 2/2015 | Fisher | | B61C 17/02 701/22 |
| 9,051,906 B2* | 6/2015 | Armesto | | F02M 37/54 |
| 9,140,680 B2* | 9/2015 | Castleberry | | F02M 25/0227 |
| 9,194,343 B2* | 11/2015 | Thienel | | B01D 29/23 |
| 9,212,627 B2* | 12/2015 | Fulton | | F02M 25/0222 |
| 9,228,529 B2* | 1/2016 | Nam | | F02D 41/22 |
| 9,302,207 B2* | 4/2016 | Lauer | | B01D 36/003 |
| 9,388,779 B2* | 7/2016 | Kim | | F02M 37/0029 |
| 9,416,758 B2* | 8/2016 | Myers | | F02M 33/08 |
| 9,440,169 B2* | 9/2016 | Shafer | | B01D 29/52 |
| 9,486,725 B2* | 11/2016 | Ries | | B01D 35/0276 |
| 9,732,714 B2* | 8/2017 | Anderson | | F02M 37/28 |
| 10,226,736 B1* | 3/2019 | Cottingham | | B65D 88/76 |
| 10,344,730 B2* | 7/2019 | Grange | | F02M 37/32 |
| 10,400,721 B2* | 9/2019 | Knapp | | F02M 37/32 |
| 10,478,780 B2* | 11/2019 | Rupp | | F02M 37/32 |
| 10,519,908 B2* | 12/2019 | Ono | | F02M 37/04 |
| 10,598,140 B2* | 3/2020 | Kerrin | | F02M 37/32 |
| 10,677,206 B2* | 6/2020 | Wheelwright | | B01D 69/10 |
| 10,697,411 B2* | 6/2020 | Girondi | | B01D 35/30 |
| 10,722,826 B2* | 7/2020 | Morris | | B01D 36/005 |
| 10,753,301 B2* | 8/2020 | Prabhala | | B01D 46/0086 |
| 10,753,330 B2* | 8/2020 | Eadie | | B01D 36/006 |
| 10,843,112 B2* | 11/2020 | Sugio | | F01N 3/0835 |
| 11,014,022 B2* | 5/2021 | Gates | | B01D 36/006 |
| 11,149,701 B2* | 10/2021 | Dhingra | | F02M 35/0205 |
| 11,162,464 B1* | 11/2021 | Albladi | | F02M 37/28 |
| 11,261,815 B2* | 3/2022 | Prabhala | | B01D 46/46 |
| 11,333,116 B2* | 5/2022 | Bhat | | B01D 36/006 |
| 11,448,173 B2* | 9/2022 | Jiang | | F02M 37/28 |
| 11,459,986 B2* | 10/2022 | Moore | | F02M 37/34 |
| 11,598,237 B2* | 3/2023 | Fulton | | F01N 3/36 |
| 2002/0170545 A1* | 11/2002 | Ekstam | | F02M 37/24 123/557 |
| 2003/0121860 A1* | 7/2003 | Harenbrock | | F02M 37/30 210/660 |
| 2003/0150783 A1* | 8/2003 | Roesgen | | F02M 37/48 210/194 |
| 2005/0121374 A1* | 6/2005 | Girondi | | B01D 36/003 210/97 |
| 2005/0155585 A1* | 7/2005 | Bradford | | F02M 37/30 123/510 |
| 2006/0070956 A1* | 4/2006 | Herrmann | | B01D 36/008 210/744 |
| 2006/0086649 A1* | 4/2006 | Wieczorek | | F02M 37/24 210/120 |
| 2006/0277899 A1* | 12/2006 | Ruona | | F01N 3/04 60/310 |
| 2007/0125695 A1* | 6/2007 | Pichler | | B01D 36/003 210/259 |
| 2007/0175807 A1* | 8/2007 | Roesgen | | F02M 37/30 210/194 |
| 2007/0186877 A1* | 8/2007 | Schulz | | F02M 37/32 210/348 |
| 2008/0110812 A1* | 5/2008 | Jensen | | F02M 25/0222 137/1 |
| 2008/0128350 A1* | 6/2008 | Arakawa | | B01D 71/0281 210/500.21 |
| 2008/0135107 A1* | 6/2008 | Noh | | F16L 55/07 137/334 |
| 2009/0113880 A1* | 5/2009 | Clausen | | F01N 13/009 210/348 |
| 2009/0145823 A1* | 6/2009 | Lauer | | F02M 37/0047 210/97 |
| 2011/0088800 A1* | 4/2011 | Core | | F02M 37/54 210/799 |
| 2011/0219780 A1* | 9/2011 | Prabhu | | F22B 1/26 60/39.19 |
| 2012/0042961 A1* | 2/2012 | Anderson | | F02M 37/30 137/172 |
| 2012/0193300 A1* | 8/2012 | Anderson | | B01D 17/00 210/741 |
| 2012/0303204 A1* | 11/2012 | Narisako | | B01D 36/005 701/29.6 |
| 2012/0312022 A1* | 12/2012 | Lam | | F02M 37/0052 210/791 |
| 2013/0048754 A1* | 2/2013 | Ortlepp | | F01N 3/36 239/289 |
| 2013/0144506 A1* | 6/2013 | Nam | | F02D 41/04 701/102 |
| 2013/0220280 A1* | 8/2013 | Armesto | | F02M 37/24 123/509 |
| 2013/0240066 A1* | 9/2013 | Ono | | F02M 37/0023 137/565.01 |
| 2014/0021118 A1* | 1/2014 | Shafer | | B01D 29/56 210/232 |
| 2014/0165968 A1* | 6/2014 | Kim | | F02M 37/44 123/468 |
| 2014/0166596 A1* | 6/2014 | Anderson | | F02M 37/28 210/744 |
| 2014/0174410 A1* | 6/2014 | Myers | | F02M 37/0035 123/514 |
| 2014/0290610 A1* | 10/2014 | Cordatos | | B01D 17/085 123/557 |
| 2014/0331974 A1* | 11/2014 | Ahmad | | F02M 37/12 123/495 |
| 2015/0057853 A1* | 2/2015 | Fisher | | B61C 17/12 701/19 |
| 2016/0051916 A1* | 2/2016 | Lauer | | F02M 37/0047 210/99 |
| 2016/0201622 A1* | 7/2016 | Kreibig | | F02M 37/0047 123/495 |
| 2016/0230733 A1* | 8/2016 | Grange | | F02M 37/32 |
| 2017/0021295 A1* | 1/2017 | Willems | | F02M 37/54 |
| 2017/0159624 A1* | 6/2017 | Reischmann | | F02M 37/40 |
| 2017/0204822 A1* | 7/2017 | Ono | | F02M 37/0082 |
| 2017/0354933 A1* | 12/2017 | Rupp | | B01D 69/08 |
| 2018/0023526 A1* | 1/2018 | Wheelwright | | F02M 37/50 |
| 2018/0093209 A1* | 4/2018 | Kato | | B01D 36/001 |
| 2018/0274505 A1* | 9/2018 | Wieczorek | | B01D 36/003 |
| 2019/0107090 A1* | 4/2019 | Nehmer | | F02M 37/24 |
| 2019/0293036 A1* | 9/2019 | Marcus | | B01D 35/005 |
| 2019/0316554 A1* | 10/2019 | Berg | | F02D 41/3082 |
| 2019/0316556 A1* | 10/2019 | Gerstenmeyer | | F02M 37/007 |
| 2019/0344199 A1* | 11/2019 | Gates | | B01D 36/005 |
| 2019/0366836 A1* | 12/2019 | Farina | | B60K 15/04 |
| 2020/0277921 A1* | 9/2020 | Jiang | | F02M 37/34 |
| 2020/0347809 A1* | 11/2020 | Bhat | | F02M 37/04 |
| 2021/0180542 A1* | 6/2021 | Bruhn | | F02M 25/0224 |
| 2021/0260500 A1* | 8/2021 | Goetzke | | F02M 37/24 |
| 2022/0090569 A1* | 3/2022 | Gerstenmeyer | | F02M 37/28 |
| 2022/0107303 A1* | 4/2022 | Goltzman | | F02M 37/28 |

FOREIGN PATENT DOCUMENTS

| | | |
|---|---|---|
| DE | 102010002607 A1 | 9/2011 |
| GB | 1578306 A | 11/1980 |
| GB | 2482956 A | 2/2012 |
| RU | 106129 U1 | 7/2011 |
| SU | 1605012 A1 | 11/1990 |
| WO | WO 2006034889 A1 | 4/2006 |
| WO | WO 2009059102 A2 | 5/2009 |

(56) References Cited

FOREIGN PATENT DOCUMENTS

| WO | WO 2012024013 A1 | 2/2012 | |
|----|----|----|----|
| WO | WO-2018091297 A2 * | 5/2018 | ......... B01D 17/0214 |
| WO | WO-2018091297 A3 * | 7/2018 | ......... B01D 17/0214 |

* cited by examiner

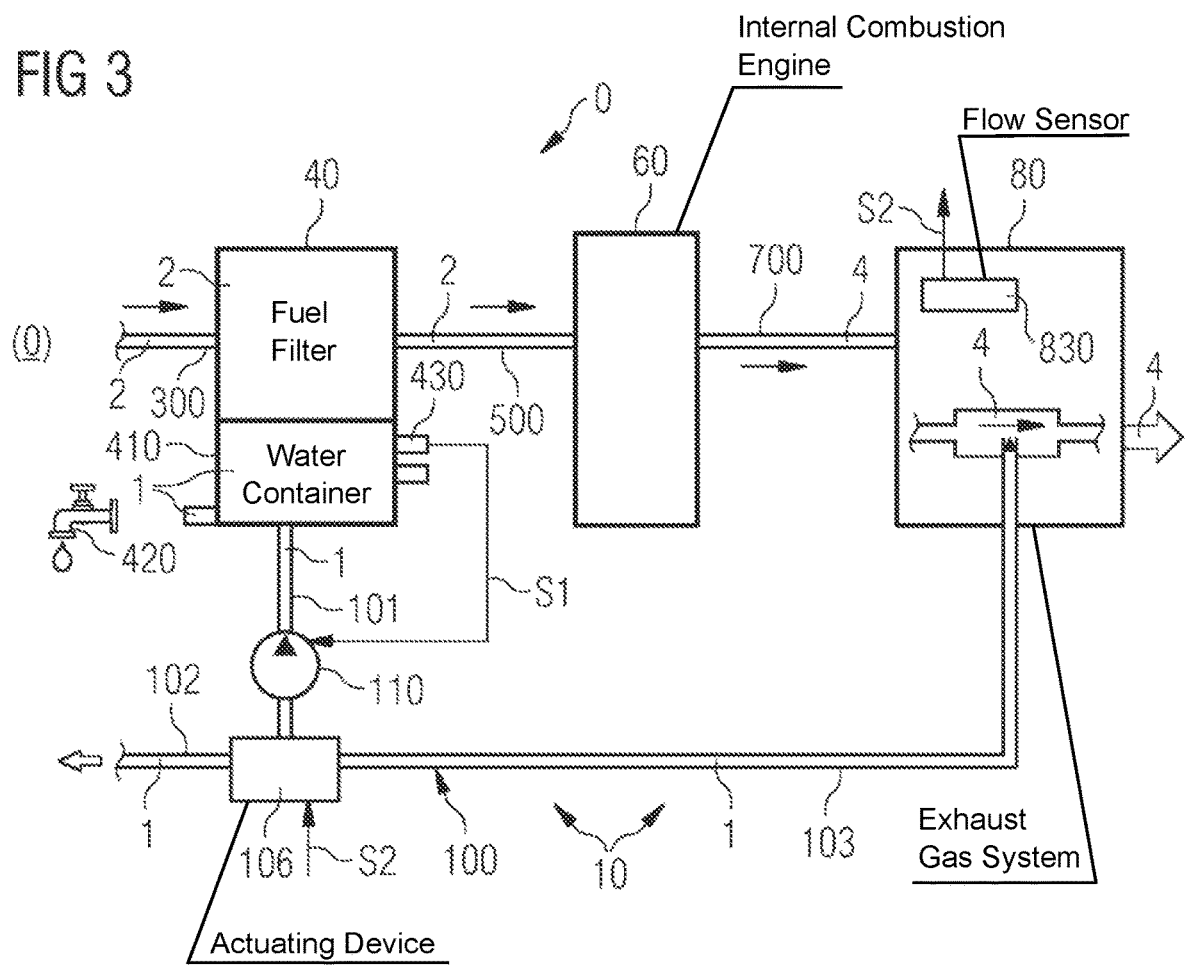

DEWATERING FUEL IN A DIESEL LOCOMOTIVE

CROSS-REFERENCE TO RELATED APPLICATION

This application is a continuation of patent application Ser. No. 16/462,307, filed May 20, 2019, which was a § 371 national stage filing of international application PCT/EP2017/078327, filed Nov. 6, 2017, which designated the United States; this application also claims the priority, under 35 U.S.C. § 119, of German patent application No. DE 102016222778.5, filed Nov. 18, 2016; the prior applications are herewith incorporated by reference in their entirety.

FIELD AND BACKGROUND OF THE INVENTION

The invention relates to a method for dewatering an operating substance, in particular a fuel, preferably during operation of a vehicle, in particular a rail vehicle. Furthermore, the invention relates to a dewatering device for an operating substance, in particular a fuel, and to an operating substance supply device, in particular a fuel supply device, for a vehicle, in particular a rail vehicle. Furthermore, the invention relates to an engine, in particular a diesel engine, a drive, in particular a diesel drive, a power unit or a vehicle.

In the case of a rail vehicle, in particular a diesel locomotive (traction unit), the problem exists that an excessive amount of water can be situated in an operating substance, in particular a fuel. An introduction of water into the operating substance takes place, for example, via tank depots, a defective tank closure, condensation water, etc., an excessive amount of water inevitably leading to damage, in particular engine damage. Furthermore, the fuel is removed from a fuel tank at the bottom with the aim of minimizing silting up. Here, however, water which has settled in the fuel tank is also conveyed into a filter and in the direction of an internal combustion engine of the rail vehicle.

In order to achieve damage and therefore an operational extension of a rail vehicle despite operating substance which is contaminated with water, it is necessary to remove the water from the operating substance. This applies, in particular, to an operational extension and an avoidance of engine damage in the case of a diesel locomotive, the diesel fuel of which is contaminated with water. A conventional solution of said problem consists in that the water which is entrained in the diesel fuel is separated in a separate water container. A traction unit driver is given the prompt to discharge the water above a fixed filling quantity of water in the water container. This is usually ignored and as a consequence leads to damage in an internal combustion engine of the diesel locomotive.

SUMMARY OF THE INVENTION

It is an object of the invention to specify an improved method for dewatering an operating substance, in particular a fuel, preferably during operation, for example, of a vehicle, in particular a rail vehicle. Furthermore, it is an object of the invention to specify a corresponding dewatering device for the operating substance, and a corresponding operating substance supply device for an engine, for example, of a vehicle, in particular of a rail vehicle. In accordance with the invention, undesired conveying of water to an engine or to the engine is to be avoided, in order to prevent damage in the engine of the vehicle.

The object of the invention is achieved by way of a method for dewatering an operating substance, in particular a fuel, preferably during operation of a vehicle, in particular a rail vehicle; by means of a dewatering device for an operating substance, in particular a fuel of a vehicle, in particular of a rail vehicle; by means of an operating substance supply device, in particular a fuel supply device for a vehicle, in particular a rail vehicle; and by means of an engine, in particular a diesel engine, a drive, in particular a diesel drive, a power unit or a vehicle; as claimed in the independent claims. Advantageous developments, additional features and/or advantages of the invention result from the dependent patent claims and/or the following description of the invention.

In the case of the dewatering method according to the invention, operating substance is conveyed out of an operating substance tank, preferably of the vehicle, and water which is present on/in the operating substance is in the process first of all separated into a water container, water being conveyed, in chronological order, out of the water container (back) into the operating substance tank, (further) into an exhaust gas system, preferably of the vehicle, and/or out of the operating substance tank (again) to the exhaust gas system. In the first case, this is a method for water recirculation and, in the second case, this is a method for water removal. A combination is a method for water removal with water recirculation or possibly with water recirculation.

Here, the water is preferably present at least in droplet form on/in the operating substance. A water container is to be understood to mean a partially closed space (vessel) which is suitable for collecting a defined quantity of water. Here, the water container does not need to be designed specifically as a water container; a space for collecting water is sufficient. The water container can thus, for example, also be a section of an operating substance filter, such as of an operating substance prefilter. It is of course also possible to design the water container specifically as a water container of this type. In the case of the operating substance filter, this can be a hollow region of a housing of the operating substance filter, in which hollow region, for example, there is no filter material.

In accordance with the invention, in the case of a sufficiently filled or substantially filled water container, water can be conveyed out of the water container back to/into the operating substance tank again. Furthermore, a liquid (water and/or operating substance) in the water container can be conveyed temporarily or permanently back to/into the operating substance tank again. Moreover, in the case of a sufficiently filled or substantially filled water container and an at least sufficient exhaust gas volumetric flow, water can be conveyed out of the water container to/into the exhaust gas system. Furthermore, in the case of an at least sufficient exhaust gas volumetric flow, water can be conveyed out of the operating substance tank and/or out of the water container to/into the exhaust gas system.

In one embodiment, water can be conveyed by means of a water conveying device substantially at the bottom into the operating substance tank. That is to say, liquid water is added to a liquid (operating substance, preferably water) substantially at the bottom in the operating substance tank. Furthermore, in one embodiment, water can be conveyed by means of a water conveying device into the exhaust gas system. That is to say, liquid water is added to a hot exhaust gas flow, preferably in an exhaust gas silencer of the exhaust gas system, preferably evaporates substantially there and is discharged into the surrounding area. Here, a dewatering device or an opening of the dewatering device on/in the exhaust gas system can possibly additionally be configured as a vacuum pump.

Furthermore, in one embodiment, water can be conveyed by means of a water conveying device into the operating substance tank and/or water can be conveyed by means of said water conveying device into the exhaust gas system. That is to say, this is a combination of the above two exemplary embodiments. The water conveying device is configured, in particular, as a dewatering pump. In one embodiment, water can be capable of being discharged and/or can be discharged out of the operating substance tank, the water container, a dewatering line and/or a water conveying device. Furthermore, in one embodiment, operating substance can be conveyed out of the operating substance tank substantially at the height of a level of the operating substance in the operating substance tank. This preferably takes place by means of an operating substance intake float and preferably by means of a preferably flexible operating substance hose on the operating substance intake float.

In one embodiment of the invention, water which is present on/in an operating substance supply device of an engine can be capable of being discharged and/or can be discharged temporally before filling or starting up of an engine. This can take place, for example, at a water removal point of the operating substance tank, of the water container, of the dewatering line and/or of the water conveying device. In accordance with the invention, the operating substance can be conveyed toward an internal combustion engine, and/or water can be conveyed out of the water container by means of the water conveying device, in particular a dewatering pump. Furthermore, in one embodiment of the invention, the water conveying device can operate in a manner which is controlled by sensor signal, is temporary, is time-controlled in an adjustable manner, or permanently.

The dewatering device according to the invention has a water container, in which water which is present on/in an operating substance can be separated, the dewatering device having a dewatering line which leads from the water container to an operating substance tank preferably of the vehicle and/or to an exhaust gas system, preferably of the vehicle. That is to say, by means of the dewatering line, the water which can be collected in the water container can be conveyed (back) to/into the operating substance tank, out of the operating substance tank to/into the exhaust gas system, (furthermore) to/into the exhaust gas system, and/or first of all to/into the operating substance tank and, in chronological sequence, to/into the exhaust gas system.

The dewatering line can have a feed line to a water conveying device and a return line from the water conveying device to the operating substance tank. Furthermore, the dewatering line can have a feed line to a water conveying device and a forward feed line from the water conveying device to the exhaust gas system. Furthermore, the dewatering line can have a feed line to a water conveying device and both a return line from the water conveying device to the operating substance tank and a forward feed line from the water conveying device to the exhaust gas system, it being possible for the return line to be coupled fluid-mechanically to the forward feed line.

It is of course possible to provide the water conveying device substantially directly on the water container, on the operating substance tank or on the exhaust gas system. In the case of this type, apart from a relevant connector or relevant connectors, the feed line, the return line and/or the forward feed line, or even the dewatering line itself, are/is dispensed with. The corresponding line is then substituted by way of the water conveying device and its connector. The water container, the operating substance tank, the dewatering line and/or the water conveying device can have a water removal point. If the dewatering line has at least one water removal point, this can be provided on the feed line, the return line and/or the forward feed line. The water removal point can be configured, for example, as a manually or electromechanically actuable dewatering valve, such as a drain cock.

In accordance with the invention, the operating substance preferably comes from the operating substance tank. Furthermore, the water container can be part of an operating substance filter of the vehicle, preferably part of an operating substance prefilter of the vehicle. Moreover, the dewatering line and/or the feed line, the return line and/or the forward feed line can have an actuating means. Furthermore, a return and/or a forward feed of the water can be capable of being prevented by means of the actuating means (check valve).

In one embodiment, the dewatering device can be configured in such a way that operating substance can be conveyed out of the operating substance tank by means of an operating substance intake float which can float on the operating substance in the operating substance tank and preferably by means of an operating substance hose which is, in particular, flexible in the operating substance tank. Here, an operating substance supply device which has the dewatering device is configured in such a way that the operating substance can subsequently be conveyed into an operating substance filter, preferably an operating substance prefilter, and into an internal combustion engine. If an operating substance prefilter is used, an operating substance main filter is preferably provided, furthermore, between the operating substance prefilter and the internal combustion engine.

The operating substance supply device according to the invention has an operating substance tank, it being possible for operating substance in the operating substance tank to be conveyed out of the operating substance tank by means of an operating substance intake float which can float on the operating substance in the operating substance tank. The operating substance intake float can have a preferably flexible operating substance hose, by means of which operating substance can be conveyed out of the operating substance tank. Here, the operating substance hose can be further contact-connected fluid-mechanically, for example at the top, in the middle or at the bottom in/on the operating substance tank, for which reason the operating substance tank can have a corresponding connector. It is also possible that the operating substance hose is guided through a wall of the operating substance tank and is further contact-connected fluid-mechanically outside the operating substance tank.

The operating substance supply device can have an operating substance conveying device downstream of the operating substance intake float or the operating substance hose. The operating substance conveying device, in particular an operating substance pump, is preferably provided outside the operating substance tank. Furthermore, the operating substance supply device can have an operating substance filter, in particular an operating substance prefilter and/or an operating substance main filter, and corresponding operating substance lines. Furthermore, the operating substance tank can have a water removal point.

The invention is described in greater detail in the following text using exemplary embodiments with reference to the appended drawing which is diagrammatic and not to scale. Sections, elements, components, units, diagrams and/or components which have an identical, univocal or analogous configuration and/or function are labeled with the same designations in the description of the figures (see below), the list of designations, the patent claims and in the figures of the drawing. Furthermore, a possible alternative which is non-exhaustive and/or is not described in the description (description of the invention (see above), description of the figures (see below)) and is not shown in the drawing, a static and/or kinematic reversal, a combination, etc. with respect to the exemplary embodiments of the invention and/or a component, a diagram, a unit, a structural element, an element or a section thereof, can be gathered from the list of designations.

In the case of the invention, a feature (section, element, structural element, unit, component, function, size, etc.) can be of positive (that is to say, present) or negative (that is to say, absent) configuration, a negative feature not being described explicitly as a feature unless it is noted in accordance with the invention that it is absent. A feature of this specification (description, list of designations, patent claims, drawing) can be used not only in a specified type and/or way, but rather also in another type and/or way (isolation, combination, replacement, addition, individual use, omission, etc.). It is possible, in particular, to replace, add or omit a feature in the patent claims and/or the description on the basis of a designation and a feature which is assigned to the latter, or vice versa, in the description, the list of designations, the patent claims and/or the drawing. Moreover, as a result, a feature can be interpreted and/or specified in greater detail in a patent claim.

The features of this specification can also be interpreted as optional features (in view of the prior art which is usually unknown); that is to say, each feature can be understood to be an optional, arbitrary or preferred, that is to say not mandatory feature. A separation of a feature, possibly including its periphery, from an exemplary embodiment is thus possible, it then being possible for said feature to be transferred to a generalized concept of the invention. The absence of a feature (negative feature) in an exemplary embodiment shows that the feature is optional in relation to the invention. Furthermore, in the case of an identity of the type of a feature, a generic term for the feature can also be understood (possibly further hierarchical breakdown into sub-genre, sector, etc.), as a result of which, for example with consideration of equivalent effect and/or equivalence, a generalization of one or said feature is possible. In the figures which are merely by way of example:

BRIEF DESCRIPTION OF THE FIGURES

FIG. 3 shows a third embodiment of the dewatering device according to the invention for the vehicle, in particular the rail vehicle.

DETAILED DESCRIPTION OF THE INVENTION

Figure 1:
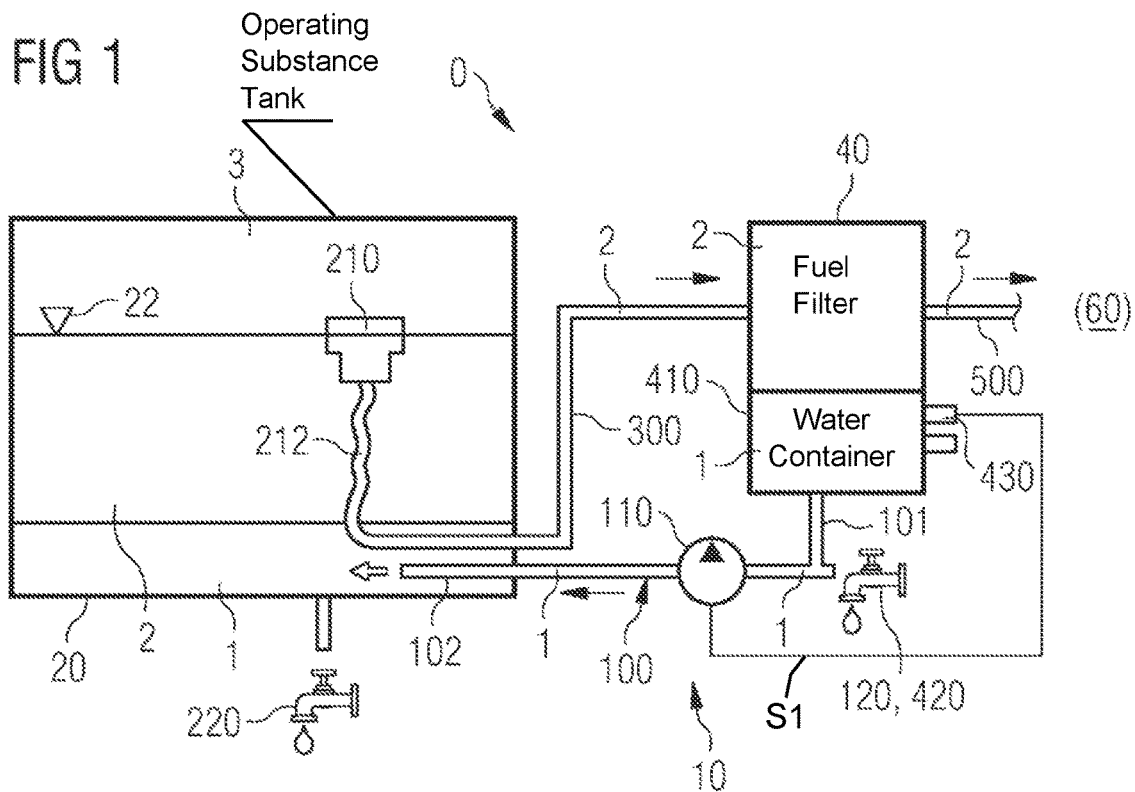
FIG. 1 shows one embodiment of an operating substance supply device according to the invention and a first embodiment of a dewatering device according to the invention for a vehicle.

The invention is described in greater detail in the following text on the basis of exemplary embodiments of one embodiment of one variant of an operating substance supply device 0 (cf. FIG. 1) and of three embodiments of one variant (cf. FIGS. 1 to 3) of a dewatering device 10 for a rail vehicle. The invention is not restricted, however, to a variant of this type and/or the exemplary embodiments which are described in the following text, but rather is of more fundamental nature, with the result that it can be applied to all dewatering devices within the context of the invention.

A dewatering device according to the invention can thus be applied to all internal combustion engines, in particular diesel engines. This relates, for example, to engines of power generators, trucks, military vehicles, rail vehicles, ships, etc. Furthermore, the invention can be applied to all areas which have to expect contaminated diesel fuels, such as in mining, on construction sites, etc. Relevant manufacturers are, for example, engine manufacturers; engine suppliers, for example filter manufacturers; commercial vehicle manufacturers; manufacturers of power generators; manufacturers of marine engines, etc.

The drawing shows only those sections which are necessary for an understanding of the invention. Although the invention is described and illustrated in greater detail by way of preferred exemplary embodiments, the invention is not restricted by way of the disclosed exemplary embodiments. Other variations can be derived herefrom without departing from the scope of protection of the invention.

FIG. 1 shows the operating substance supply device 0 according to the invention, preferably configured as a fuel supply device 0, the supply device 0 having at least one operating substance tank 20, in particular a fuel tank 20, preferably with an inner protective coating or an inner phosphating treatment. A height 22 or level 22 of an operating substance 2, in particular a fuel 2, is marked by way of a triangle 22 in FIG. 1. Air 3 is usually situated above this. The fuel 2 can be removed from the fuel tank 20 by means of a fuel intake float 210 (operating substance intake float 210) which can float on the fuel 2, and can be conveyed away from the intake float 210, in particular, through a preferably at least partially flexible fuel hose 212 (operating substance hose 212). Here, the fuel hose 212 is preferably connected fluid-mechanically to the intake float 210.

A fluid-mechanical further contact connection of the fuel hose 212 can take place at a connector which preferably lies on the inside in the fuel tank 20, or the fuel hose 212 is guided to the outside and is further contact-connected fluid-mechanically on the fuel tank 20 or another apparatus, such as a fuel filter 40 (operating substance filter 40). Here, the fuel hose 212 can lead to a fuel line 300 (operating substance line 300) which connects the fuel intake float 210 fluid-mechanically to the fuel filter 40. Furthermore, the supply device 0 can have a fuel conveying device (operating substance conveying device) downstream of the fuel intake float 210, in particular downstream of the fuel hose 212.

Furthermore, apart from connectors, etc., the supply device 0 can comprise the fuel filter 40, preferably a fuel prefilter 40 (operating substance prefilter 40) and/or a fuel main filter (operating substance main filter) and a fuel line 500 (operating substance line 500) from the fuel filter 40 to an internal combustion engine 60, in particular a diesel engine 60, of the rail vehicle. One advantage of said arrangement lies in the fact that the fuel 2 in the fuel tank 20 can be sucked into the fuel filter 40 via the intake float 210 on a surface or in a surface region of the fuel 2, as a result of which merely a small water quantity is separated in the fuel filter 40 (see below) in comparison with a lower intake region (prior art).

Figure 2:
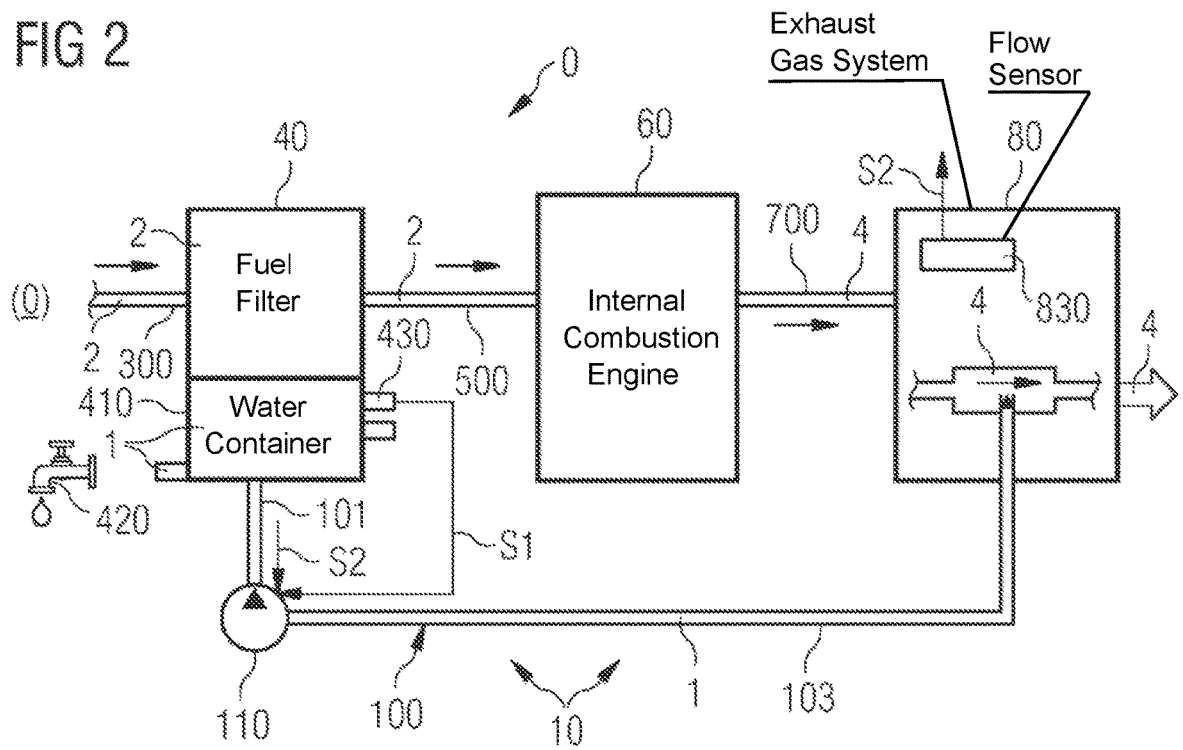
FIG. 2 shows a second embodiment of the dewatering device according to the invention for the vehicle, in particular a rail vehicle.

In one preferred embodiment of the device according to the invention or the system according to the invention (drive, in particular diesel drive, rail vehicle, motor vehicle, etc.), water 1 which is separated in a water container 410 is guided back into a fuel tank 20 (FIG. 1). Furthermore, in one preferred embodiment, water 1 which is separated in the water container 410 can be conveyed further into an exhaust gas system 80, where it is evaporated in a flow of a hot exhaust gas 4, preferably in an exhaust gas silencer 80, and water vapor which is produced is discharged into a local surrounding area (FIG. 2). Furthermore, in one preferred embodiment, water 1 which is separated in the water container 410 can be guided back into the fuel tank 20 again, and separated water 1 (from the fuel tank 20 or the water container 410) can be conveyed into the exhaust gas system 80 (FIG. 3).

FIGS. 1 to 3 in each case show an embodiment of the dewatering device 10 of a fuel 2 (operating substance 2) of the rail vehicle or of its fuel supply device 0. Here, the dewatering device 10 comprises substantially a dewatering line 100 which leads from a water container 410 to a fuel tank 20 (operating substance tank 20) and/or from the water container 410 to an exhaust gas system 80, in particular an exhaust gas silencer 80. The dewatering line 100 can have a water removal point 120, optionally with a dewatering actuating means (for example, a dewatering valve, a drain cock, manually or electromechanically actuable).

For conveying water 1 which is separated in the water container 410, the dewatering device 10 or the dewatering line 100 has a water conveying device 110, in particular a dewatering pump 110. The water container 410 can be a part or a section of a fuel filter 40 (operating substance filter 40), preferably of a fuel prefilter 40 (operating substance prefilter 40). The water conveying device 110 can have a water removal point (not shown), optionally with a dewatering actuating means (for example, a dewatering valve, a drain cock, manually or electromechanically actuable). Furthermore, the fuel tank 20 and/or the water container 410 can have a water removal point 220, 420, optionally in each case with a dewatering actuating means (for example, a dewatering valve, a drain cock, manually or electromechanically actuable).

Depending on a position of one or a plurality of actuating means, preferably one or a plurality of electrically actuable and/or manually operable valves, in the dewatering device 10 or the dewatering line 100, water 1 which is separated in the water container 410 can be conveyed back to/into the fuel tank 20 and/or forward to/into the exhaust gas system 80. Here, furthermore, depending on a position of the relevant actuating means, the fuel tank 20 can be brought into fluid-mechanical contact with the exhaust gas system 80. The following embodiments can of course also be applied to an operating substance 2 instead of the fuel 2.

In addition to the fuel supply device 0, FIG. 1 shows the first embodiment of the dewatering device 10. Here, the dewatering line 100 comprises a feed line 101 and merely a return line 102. The feed line 101 leads from the water container 410 to the water conveying device 110/into the return line 102. The return line 102 leads from the feed line 101, from the water conveying device 110 back to/into the fuel tank 20. Here, the feed line (101) can be configured as a section of the return line 102, or vice versa. The water container 410 and/or the feed line 101 (preferably) have/has a water removal point 120, 420.

The water container 410 preferably has a water container sensor 430 or water container detector 430 which outputs a sensor signal S1 in a manner which is dependent on a height or level of water 1 in the water container 410. In the simplest case, the water container sensor 430 is a threshold value sensor. Via a sensor signal S1 (for example: "water container full" (water container 410 which is filled sufficiently or substantially with water 1)), the preferably maintenance-free dewatering pump 110 conveys water 1 out of the water container 410 at the bottom downward directly into the fuel tank 20. Deposited silt is swirled up in the fuel 2 in the fuel tank 20 as a result of a return of the water 1 into the fuel tank 20 at the bottom, and can be separated later in the fuel prefilter 40.

A valve (not shown), for example a check valve, in the return line 102 can avoid an undesired return of water 1 out of the fuel tank 20 into the water container 410. During discharging, said valve can be bypassed by way of the dewatering actuating means of the water removal point 120/220/420. In addition to a sensor signal actuation, the dewatering pump 110 can also operate in an adjustably time-controlled or permanent manner. A fuel 2 which is possibly entrained in all three cases does not lead to a failure. The water 1 can be discharged at the fuel tank 20 (water removal point 220) and/or at the fuel prefilter 40 (water removal point 120, 420).

An operator or traction unit driver of the rail vehicle can continue a journey safely and without an interruption until an upcoming fuel stop. Engine damage or even complete engine failure is avoided safely. Before filling of the rail vehicle, water 1 should be discharged at the fuel prefilter 40. The end criteria of this operation remain identical for the operator or traction unit driver. Should no water 1 be discharged, a filling quantity of fuel 2 and therefore merely a range of the rail vehicle are decreased.

FIG. 2 shows the second embodiment of the dewatering device 10. Here, the dewatering line 100 comprises a feed line 101 and merely a forward feed line 103. The feed line 101 leads from the water container 410 to the water conveying device 110/into the forward feed line 103. The forward feed line 103 leads from the feed line 101/from the water conveying device 110 forward to/into the exhaust gas system 80, in particular to/into the exhaust gas silencer 80. Here, the feed line (101) can be configured as a section of the forward feed line 103, or vice versa. The water container 410 (preferably) and/or the feed line 101 have/has a water removal point 120, 420.

Here, as is also the case in FIG. 1, the water container sensor 430 or water container detector 430 can be provided in an analogous manner. Furthermore, the exhaust gas system 80 or the exhaust gas silencer 80 has a volumetric flow sensor 830 or volumetric flow detector 830. Here, the volumetric flow sensor 830 detects at least one volumetric flow threshold value in at least one section of the exhaust gas system 80 or the exhaust gas silencer 80, and generates a sensor signal S2.

Via a sensor signal S1 (for example, "water container full" (water container 410 which is filled sufficiently or substantially with water 1)) and the sensor signal S2 (for example, "volumetric flow reached"), the dewatering pump 110 conveys water 1 at the bottom out of the water container 410, preferably assisted by way of a vacuum pump (opening of the forward feed line 103 on/in the exhaust gas system 80 or the exhaust gas silencer 80), into the exhaust gas system 80 or the exhaust gas silencer 80. Possibly present diesel particulates are burned in the exhaust gas silencer 80. The operator or traction unit driver no longer has to discharge water 1 manually from the fuel prefilter 40 during operation of the rail vehicle. The rail vehicle is dewatered automatically during operation. Engine damage or even complete engine failure is avoided safely.

FIG. 3 shows the third embodiment of the dewatering device 10 which is a combination of the first and the second embodiment. That is to say, in addition to the feed line 101, the dewatering line 100 has both the return line 102 and the forward feed line 103. Here, an actuating means 106, in particular a valve 106, is preferably provided on/in the dewatering line 100, preferably between the feed line 101, the return line 102 and the forward feed line 103. The path (water container 410 to the fuel tank 20, water container 410 to the exhaust gas system 80, or fuel tank 20 to the exhaust gas system 80) which the separated water 1 is to take can be set by means of the valve 106. Furthermore, in exemplary embodiments, a volumetric flow through the return line 102 or the forward feed line 103 can be set by means of the valve 106. Here, the water conveying device 110 is preferably coupled fluid-mechanically into/onto the feed line 101.

Via a sensor signal S1 (for example, "water container full" (water container 410 which is filled sufficiently or substantially with water 1)), the preferably maintenance-free dewatering pump 110 conveys water 1 at the bottom out of the water container 410 downward directly into the fuel tank 20. A valve in the return line 102 prevents the undesired return of the water into the fuel prefilter 40. During discharging, said valve can be bypassed by way of the dewatering actuating means of the water removal point 120/220/420. The dewatering pump 110 can operate in a sensor-controlled, adjustably time-controlled or else permanent manner. Entrained fuel 2 does not lead to a failure.

In addition, via the valve 106 (in the case of a currentless valve 106, a line 101/102 to the fuel tank 20 is preferably open or all lines 101, 102, 103 are sealed with respect to one another), a conveying path can be switched over to the exhaust gas system 80 or the exhaust gas silencer 80 if a sensor signal S2 (for example, "volumetric flow reached") is present. Water 1 can preferably be discharged both at the fuel tank 20 and at the fuel prefilter 40. An operator or traction unit driver of the rail vehicle can continue a journey safely and without an interruption before an upcoming fuel stop, and can park the vehicle with a running engine at idling speed. The rail vehicle removes the water from the fuel 2 during the journey. Engine damage or even complete engine failure is avoided safely.

The invention claimed is:

1. A fuel system for a rail vehicle, the fuel system comprising:
    a fuel tank for holding fuel;
    a dewatering device in fluid communication with the fuel tank for separating water from fuel, including:
       a fuel filter for filtering fuel;
       a water container for collecting water separated from the fuel;
    a dewatering line including:
       a feed line in fluid communication with a lower portion of the water container, that is fluidically branched into:
       a return line in fluid communication with the fuel tank for returning separated water to the fuel tank; and
       a forward feed line in fluid communication with an exhaust gas system for forwarding separated water to the exhaust gas system where the separated water is evaporated;
    a valve for selectively controlling separated water flow from the water container to the return line or the forward feed line.

2. The fuel system of claim 1, wherein, the water container is a part of the fuel filter.

3. The fuel system of claim 1, wherein the return line includes a check valve positioned in the return line to prevent separated water from flowing back towards the water container once the separated water has passed the check valve.

4. The fuel system of claim 1, wherein, the forward feed line includes a check valve positioned in the forward feed line to prevent separated water from flowing back towards the water container once the separated water has passed the check valve.

5. The fuel system of claim 1, wherein the dewatering device further comprises a dewatering pump for conveying separated water from the water container.

6. The fuel system of claim 5, wherein, the dewatering pump is responsive to a liquid level sensor signal from a liquid level sensor.

7. The fuel system of claim 5, wherein, the dewatering pump is adjustably time-controlled.

8. The fuel system of claim 1, wherein, the exhaust gas system includes a volumetric flow sensor capable of detecting at least one volumetric flow threshold value in at least one section of the exhaust gas system and generating a volumetric flow sensor signal.

9. The fuel system of claim 1, wherein the fuel tank includes:
    an intake float capable of floating on the fuel in the fuel tank; and
    a hose disposed in the fuel tank and in fluid communication with the intake float to convey fuel out of the fuel tank.

10. The fuel system of claim 5, wherein said feed line is in fluid communication with said dewatering pump, the return line is in fluid communication with said dewatering pump and said fuel tank, and the forward feed line is in fluid communication with said detwatering pump and said exhaust gas system.

11. The fuel system of claim 5, further comprising a water removal point in at least at one of said fuel tank, said dewatering line, or said pump.

* * * * *